EMERGENCY DISPLAY FOR TOLL TICKETING

Filed Oct. 4, 1946 2 SHEETS—SHEET 1

INVENTOR
GEORGE THOMAS BAKER
BY [signature]
ATTORNEY

INVENTOR
GEORGE THOMAS BAKER
BY Chas. L. Candy
ATTORNEY

Patented Jan. 8, 1952 2,581,900

UNITED STATES PATENT OFFICE 2,581,900

EMERGENCY DISPLAY FOR TOLL TICKETING

George Thomas Baker, Liverpool, England, assignor to Automatic Electric Laboratories, Incorporated, Chicago, Ill., a corporation of Delaware Application October 4, 1946, Serial No. 701,273
In Great Britain November 8, 1945

4 Claims. (Cl. 179—27)

Figure 1:
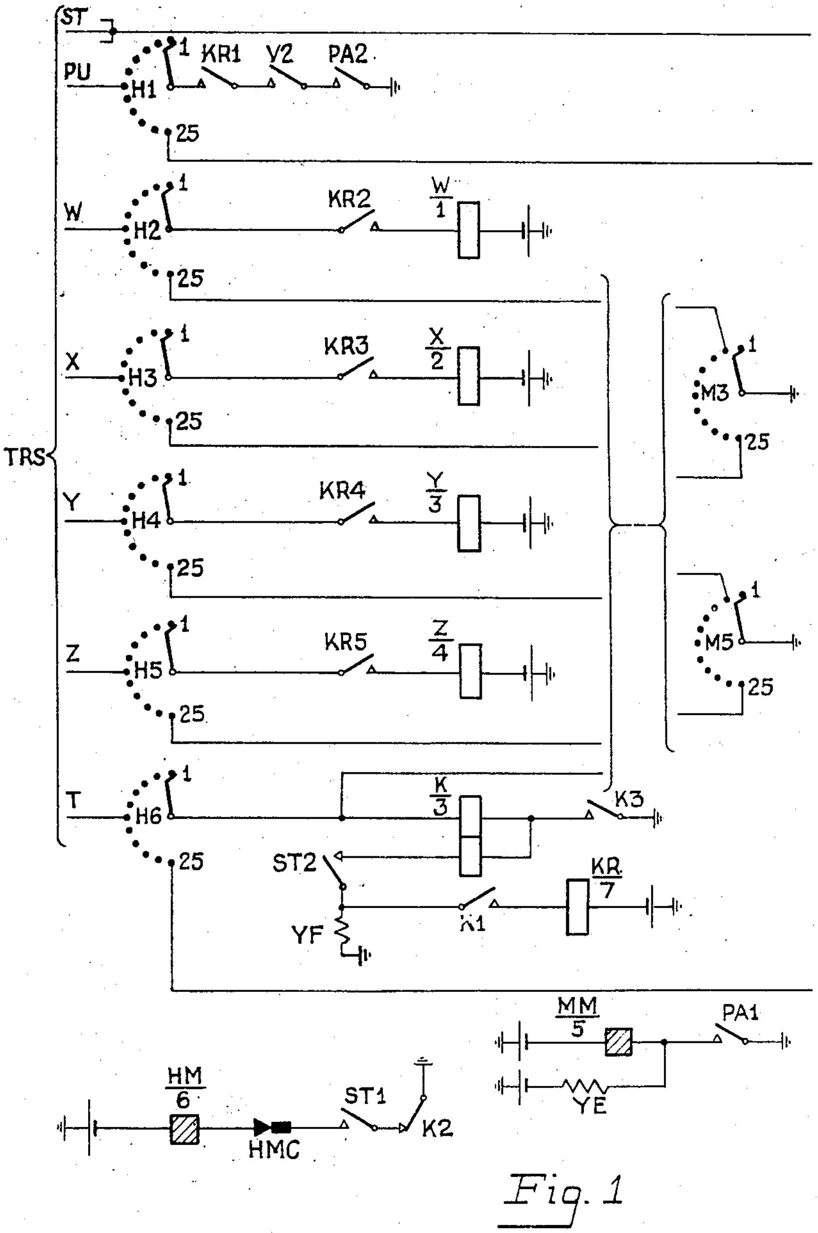

The present invention relates to telephone systems and is more particularly concerned with systems having facilities for subscribers to set up long distance connections automatically. In these circumstances it is almost essential that arrangements should be provided for enabling particulars of connections to be collected, for instance, by so-called automatic ticketing equipment in which at least the calling and called numbers and the duration of the connection are automatically recorded as by printing in order that the proper charge may be made.

One system of this type is disclosed in my United States application No. 672,386 filed May 27, 1946, and the present invention offers particular advantages in such a system. In a system of this type the recording equipment or printer which produces the finished ticket is a somewhat complicated and expensive piece of equipment and it has hitherto been considered necessary that a spare printer should be provided to enable automatic ticketing to be continued satisfactorily if any defect should develop in the regular printer. It will be appreciated that in systems where all the information relating to a call is transferred to the printer in a very short space of time, one printer is able to cater for quite a large exchange but if in addition a second printer has to be provided as a spare, this adds considerably to the cost, though the spare machine may be very seldom used.

The object of the present invention is to provide an alternative solution to this difficulty by a simple arrangement enabling details of automatic long distance connections to be satisfactorily recorded even if the recording equipment should become faulty and this at a cost which is only a small fraction of the cost of spare recording equipment.

According to one feature of the invention, in a telephone system having facilities for connecting particulars of connections, changeover arrangements are provided which enable the particulars to be automatically recorded or to be indicated temporarily for manual recording purposes. The temporary indication may consist of a visual display or an audible announcement.

According to a further feature of the invention, in a telephone system having facilities for automatically recording particulars of a connection, in the event of failure of the recording apparatus, equipment is adapted to be automatically taken into use to cause a visual display or audible announcement to be given of the particulars of a connection.

According to a further feature of the invention, in a telephone system having facilities for automatically recording particulars of a connection, in the event of failure of the recording apparatus, particulars of a connection are routed to an operator's position provided with a display panel by which the particulars are rendered visible.

In a preferred embodiment of the invention the changeover arrangements are adapted to operate automatically on the failure of the recording equipment. The particulars of connections are then displayed until the recording equipment is repaired when the reversion to automatic recording takes place automatically. Alternatively the changeover may be effected by a manual operation if for some reason it is not desired to record the particulars automatically.

Preferably the display equipment is located at an operator's position and a lamp on display panel is lighted to indicate that particulars of a connection are available. The display of the particulars, which takes place successively does not commence until the performance of a manual operation on the part of the operator. Since this is only an emergency operation it is not likely that the operator's services will be required for any considerable period and in the circumstances of use envisaged for the invention there is not likely to be difficulty in providing a suitable operator to tide over the emergency condition. In order to reduce expense and also the space taken up by the equipment, the arrangement is preferably such that there is a single lamp display panel on which the particulars which it is desired to record are displayed successively, a further lamp indicating which part of the information is being displayed at any time.

Figure 2:
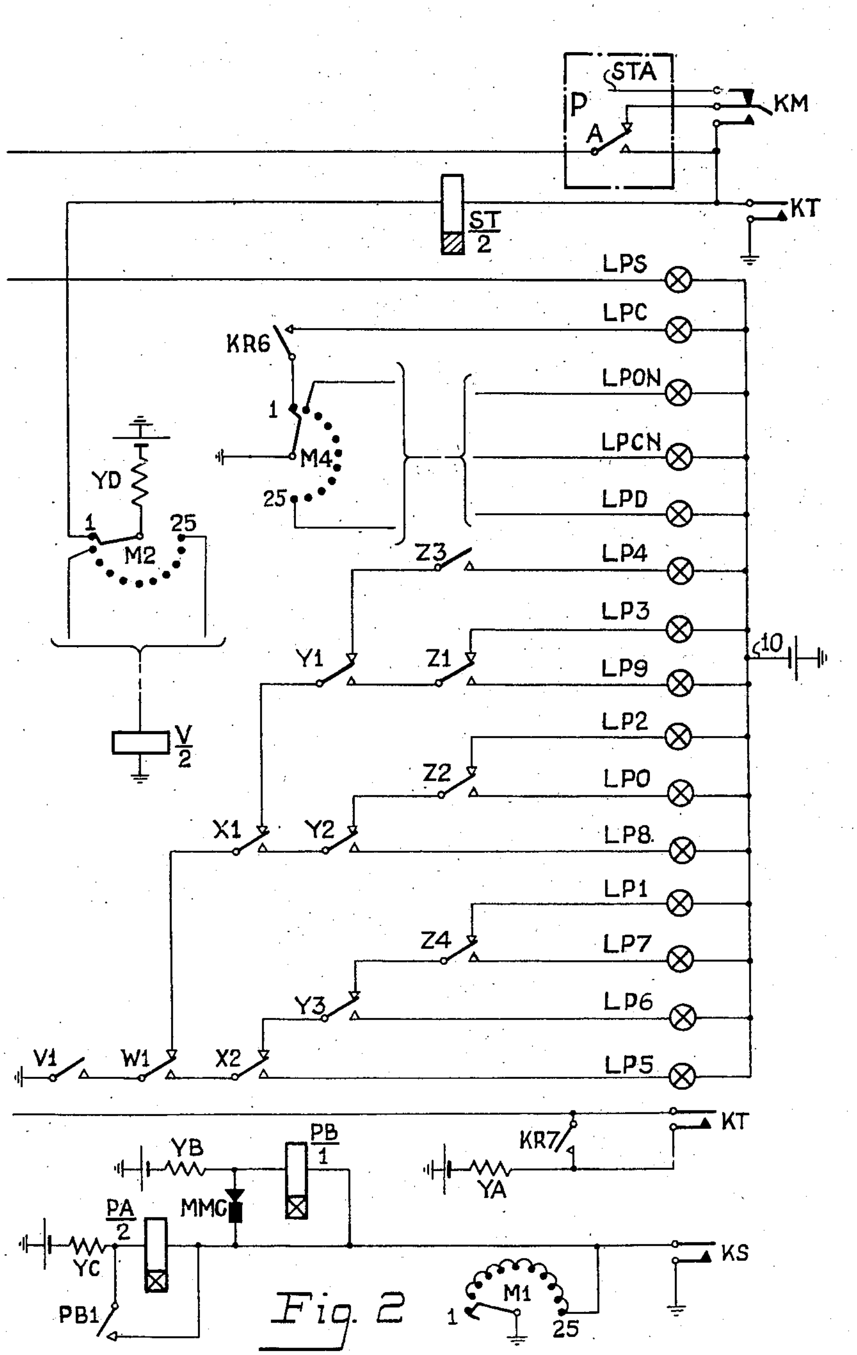

The invention will be better understood from the following description of one embodiment taken in conjunction with the drawings accompanying the specification and comprising Figs. 1 and 2 which should be arranged side by side to form a complete circuit. The embodiment shown in the drawings is intended to be applied to the equipment such as disclosed in the previously mentioned application No. 672,386.

As disclosed in my above-mentioned application, it will be noted that conductors ST, PU, W, X, Y, Z and T (enclosed by brackets and designated as PC) are connected respectively to contact banks and conductors of Figures 12 and 13. It will be appreciated that the above-named conductors are also connected to the respective contact banks and conductors shown at the left of Figure 1 of the present application.

Assuming now, that for some reason the printer controller or the printer of the above named application has failed to operate, a circuit may be completed to an alarm relay or a circuit may be completed to a visible or audible signal. The operation of the alarm relay would automatically close contacts A (Fig. 2) and start the emergency equipment to operating, or if a visible or audible alarm is given, an operator will operate the key KM to start the operation of the emergency equipment.

Assuming, for example, that key KM is operated, a circuit is completed for relay ST, which may be traced from ground on the ST conductor, the break contact at contact A, key KM, the winding of relay ST, bank contact 1 and wiper M2 to battery. In operating contacts ST1, relay ST completes an obvious circuit to motor magnet HM and at contacts ST2 prepares a circuit for relay K.

Motor magnet HM operates in a well-known manner and upon operating opens its circuit at interrupter contacts HMC, thereby restoring and advancing its wipers H1 through H6. This interaction between magnet HM and contacts HMC continues until wiper H6 encounters a marking battery potential on one of the T conductors, thereby completing a circuit for relay K. This circuit may be traced as follows: from battery on the T conductor encountered by wiper H6, upper winding of relay K, lower winding of relay K, contacts ST2, and resistance YF to ground.

In operating contacts K1 and K3, an obvious locking circuit for relay K and an operating circuit for relay KR are completed, and at contacts K2 maintains an open circuit to magnet HM.

In operating contacts KR1, relay KR prepares a point in the circuit of the pulsing lead PU, at contacts KR2, KR3, KR4 and KR5 circuits are prepared for relays W, X, Y and Z respectively, at contacts KR6 an obvious circuit is completed to lamp LPC which now indicates that a connection has been made with a junction relay set which is ready to transit the information relating to a call and at contacts KR7 a circuit is prepared when the equipment is tested.

When the operator is ready to receive the information, key KS is momentarily depressed, whereupon an obvious circuit is completed for relay PA. In operating contacts PA1, relay PA completes an obvious circuit for motor magnet MM and at contacts PA2 prepares another point in the pulsing circuit PU.

In operating interrupter contacts MMC, magnet MM removes the shunt around relay PB, which accordingly operates over a circuit similar to relay PA and at contacts PB1 short circuits relay PA. In restoring, relay PA opens the circuit to magnet MM at contacts PA1. In restoring, magnet MM advances its wipers M1 through M5 one step and restores interrupter contacts MMC to short circuit relay PB. The contacts of the bank accessible to wiper M1 are commoned, therefore, an operating circuit is maintained for relays PA and PB. Wipers M3 and M5 are only used for test purposes and will not be described at the present. As wiper M2 engages its second bank contact, the circuit to relay ST is opened and an obvious circuit is completed to relay V. As wiper M4 engages its second contact, lamp LPC is extinguished, and suitable connections are made to light an appropriate one of the lamps LPON, LPCN and LPD to indicate at any time whether the display panel represents a calling number, a called number or the duration of the connection. It will be understood that as wiper M2 moves off-normal, it closes circuits for relay V over its bank contacts which are suitably connected in the appropriate positions to relay V, which operates and prepares a pulsing circuit over conductor PU for stepping the motor magnet in the distributor switch of the junction relay set (Figs. 4, 5, 6, 7, 8 and 9 of the previously mentioned application).

In operating contacts V1, relay V prepares a circuit for the numeral lamps LP1 through LP0 and at contacts V2 prepares a circuit to the motor magnet of the distributor switch in the junction relay set.

Relay PB now restores and at contacts PB1 removes the short-circuit from relay PA which now operates. In operating contacts PA1, relay PA again completes a circuit for motor magnet MM and at contacts PA2 completes a circuit to the distributor switch motor magnet which advances its wipers one step and applies a marking ground to certain ones of the W, X, Y and Z conductors, the marking corresponding to the first identification digit stored in the junction relay set. Assuming, for example, that the first stored information is equivalent to the digit 7, the markings from the junction relay set will be applied to the W and Z conductors. Motor magnet MM now operates and at interrupter contacts MMC removes the short-circuit of relay PB which operates and short-circuits relay PA at contacts PB1. However, as both relays PB and PA are constructed to be slightly slow to operate and normally slow to release, the markings on conductors W and Z will have caused relays W and Z to operate, these circuits being traced from ground on the conductors W and Z, bank contacts engaged with wipers H2 and H5, contacts KR2 and KR5 and through the windings of relays W and Z respectively. In operating contacts W1 and Z4, relays W and Z complete a circuit to lamp 7 at LP7, this circuit extending from ground at contacts V1, make contact of W1, break contacts of X2 and Y3, the make contacts of Z4, LP7 and to battery at 10.

Relay PA now restores to open contacts PA1, which open the circuit to magnet MM and at contacts PA2 opens the circuit PU to the distributor motor magnet which advances wipers D1 through D5 of said prior application one step, thereby applying marking potential to certain ones of conductors W, X, Y and Z for the second identification letter or digit. In restoring, magnet MM advances its wipers M1 through M5 a second step. Interrupter contacts MMC are again closed and relay PB restores due to the short-circuit. In restoring contact PB1, the short circuit is removed from relay PA which operates to complete circuits to magnet MM and the distributor motor magnet via contacts PA1 and PA2. In operating interrupter contacts MMC, magnet MM again removes the short circuit from relay PB, but before relay PB has had time to operate and relay PA time to restore the second marking potential has again energized certain ones of relays W, X, Y and Z and they in turn have caused a second indicator lamp to indicate the second digit of the identification number.

The remainder of the identification digits are registered in the same manner as just described, with the switches M (of the present application) and D (of the aforementioned application) stepping in synchronism. It will be remembered that the identification of the calling party, called party and the duration of the connection are all displayed on the panel in the same manner.

It will be understood that the speed of stepping is such that the operator can readily note down the necessary information and that no other action on her part is required apart from the initial operation of the key KS. When the switch M reaches its home position the stepping ceases and the junction relay set is released owing to the fact that the distributor switch D therein has reached its home position. The circuit of relay K is then opened and relay KR also de-energises.

The key KT is provided to permit the equipment to be readily tested. When this key is thrown, a direct circuit is completed for relay ST which accordingly starts the hunting operation of the switch H and in this case a marking is effected in the final position of the bank so that the switch comes to rest in this position. As before the testing operation is then initiated by the operation of key KS and in this case the display which is produced is determined by strappings from the banks of wipers M3 and M5 which will preferably be such as to test all the lamps in the display panel. Obviously the transmission of impulses over lead PU is inappropriate in these circumstances but pulses are transmitted to the stepping lamp which accordingly gives a visual indication of the speed at which operation is taking place. Under these conditions earth extended over a suitable strapping from the bank of wiper M5 serves to shunt down relay K when testing is completed and thus the equipment is restored to normal.

It will be understood that while the invention has been described as providing a visual display, it may equally well be employed to provide an audible announcement. The leads extending to lamps LP1 to LP0 would then be connected to suitable reproducing equipment and the successive earthing of the leads would cause the appropriate digits to be announced.

I claim:

1. A telephone system wherein there is means for setting up specific markings on any of a plurality of sets of marking leads representing data concerned with an established telephone connection, an emergency identification equipment including a single display panel and a step-by-step automatic hunting switch individual thereto, said automatic switch having access to the leads to which said markings are applied, means associated with said equipment and operated in response, to the application of a series of said markings to a certain one of said sets of leads to operate said automatic switch to connect the particular set of leads on which said markings were applied to said equipment, and means controlled over said switch for successively receiving said markings and causing said markings to control said panel to temporarily display said data thereon.

2. A telephone system wherein there is means for setting up specific markings on any of a plurality of sets of marking leads representing data concerned with an established telephone connection, an emergency identification equipment including a single display panel and a step-by-step automatic hunting switch individual thereto, the automatic switch of said equipment having access to said leads, means associated with said panel and operated in response to the establishment of a marking on a certain one of said sets of leads to operate said automatic switch to connect the set of leads on which said markings occur to said equipment, a lamp on said display panel, a test relay associated with said automatic switch, means operated responsive to said connection of said set of leads with the equipment for operating said test relay to in turn operate said lamp to indicate on said panel that said connection has been made, an operator's position associated with said equipment including a key, and means controlled over said switch and said leads by manual operation of said key after said operation of said lamp for successively receiving said markings and temporarily displaying said data on said panel.

3. A telephone system wherein there is means for setting up specific markings on any of a plurality of sets of marking leads representing data concerned with an established telephone connection, an emergency indicating equipment including a single display panel, switching means and a start relay, said switching means comprising a step-by-step automatic hunting switch having access to said leads and a step-by-step automatic control switch, means for operating said start relay subsequent to the establishment of a marking on a certain one of the leads of a marked set of said leads, means controlled by the operation of said start relay for operating said hunting switch to connect the set of leads on which other of said markings occur to said equipment, means on said panel for indicating that said connection has been made, an operator's position associated with said equipment, manually controlled means at said operator's position for initiating the operation of said control switch when such indication is observed, and means for continuing said operation of said control switch to different positions, means controlled over said automatic switch by said operation of said control switch for successively receiving said markings and temporarily displaying said data on said panel.

4. A telephone system such as claimed in claim 3, including a first, a second and a third lamp located on said panel and each being individually operated responsive to a first, a second or a third operated position of said control switch for indicating the type of data being temporarily displayed by said panel.

GEORGE THOMAS BAKER.

REFERENCES CITED

The following references are of record in the file of this patent:

UNITED STATES PATENTS

| Number | Name | Date |
|---|---|---|
| 1,330,200 | Lundell | Feb. 10, 1920 |
| 1,362,126 | Matthies | Dec. 14, 1920 |
| 2,183,649 | Kahn | Dec. 19, 1939 |

FOREIGN PATENTS

| Number | Country | Date |
|---|---|---|
| 532,728 | Great Britain | Jan. 30, 1941 |